P. G. GARDINER.
Ore Amalgamator.
No. 44,525. Patented Oct. 4, 1864.
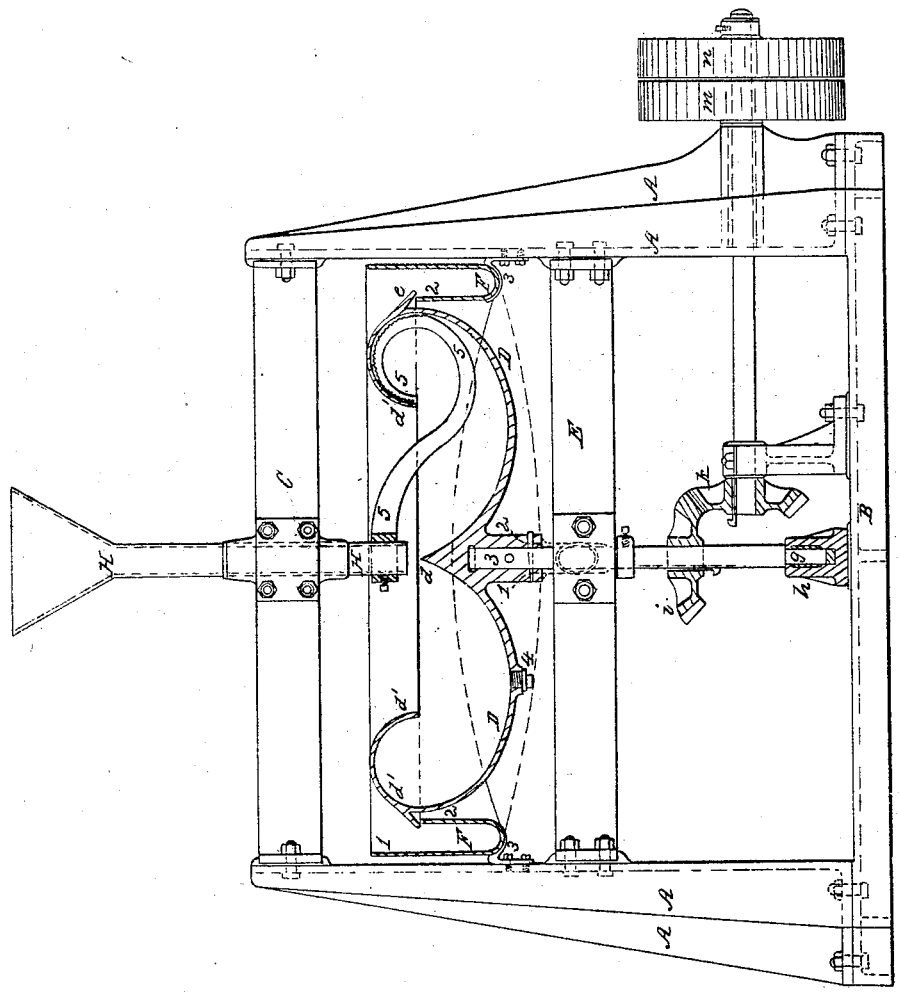
Witnesses:
Inventor

UNITED STATES PATENT OFFICE.

PERRY G. GARDINER, OF NEW YORK, N. Y.

IMPROVED AMALGAMATOR FOR GOLD AND SILVER.

Specification forming part of Letters Patent No. 44,525, dated October 4, 1864.

*To all whom it may concern:*

Be it known that I, PERRY G. GARDINER, of the city, county, and State of New York, have invented certain new and useful machinery for separating the gold contained in the pulverized matter of auriferous quartz and other ores by amalgamation with mercury; and I do hereby declare that the following is a full and exact description of my said machine and invention, reference being had to the drawing accompanying, and making part of this my specification.

The drawing is in one figure, and represents a vertical cross-section through the center of the machine.

The nature of my invention consists in subjecting the finely-pulverized dust of ores, in connection with mercury, to a powerful agitation and centrifugal action by placing them in a revolving partially-covered dish-shaped circular vessel, which by its rotation agitates and mingles the particles of dust and mercury together, so that the gold in the dust and mercury form an amalgam, at the same time by its peculiar form of rim or cover preventing the amalgam and the mercury and gold separately from being thrown out of the vessel, while all the lighter parts of earthy matters and metals not amalgamated are thrown by the centrifugal force out over the rim of the rotating vessel and pass off, a stream of water being made constantly to pour into the vessel together with the dust during the operation.

A A' are two upright parallel sides of a strong triangular frame bolted upon an oblong bed-plate, B. C is a cross-head of the frame, and E another cross-piece of the frame, the use of which will hereinafter appear.

Between the cross-pieces C E, I place the hollow, circular, flattened, dish-shaped operating-vessel D. The bottom of this vessel rises in the center so as to form a sharp cone, leaving a trough all around the vessel between the cone and the sides of the vessel. The vessel from the bottom or trough rises in a curve outward to the height of the top of $d$, and at this height it curves inward, so as to form a rim or partial cover all around the edge of the vessel D of the shape precisely of half a circle, the interior edge pointing or dropping downward, as shown at $d'$. Around the outer upper edge of the vessel is a projecting inclined flange or apron, $e$, which is of width sufficient to extend over the inner side of a surrounding vessel or trough hereinafter to be described. Upon the under side of the vessel D, at the center, is a hub, $f$, which hub is bored at the center so as to receive and hold firmly an upright driving-shaft, $g$, which extends nearly to the bed-plate at the bottom, and has its bearing there in a hollow pillow block or pedestal, $h$, within and upon which the end of the shaft rotates, and which is fitted with brass journal-box and oil-cup. The shaft $g$ passes through the cross-piece E, having there also a journal-box as a bearing for holding the shaft and vessel above steady in their rotation. Upon the shaft $g$ is keyed the bevel-pinion $i$, geared into bevel-wheel $k$, fast on horizontal driving-shaft $l$, at the other end of which are the fast and loose drums $m$ $n$, connected with any prime mover by belting. The shaft $g$ and its bearings form the support of the vessel D, upon which shaft it stands, and by which and its connections its rotation is effected. Around the exterior sides of the vessel C is the deep and narrow vessel or trough F, the exterior side, 1, of which is higher than the interior side, 2. The interior side rises near to the under surface of the apron $e$, so that whatever passes over $e$ from D will fall into the receiving-vessel F. This vessel is supported on projecting brackets 3 3, which are bolted fast to the side frame. It may have other upright supports resting on the bed-plate, if required.

4 is an opening in the bottom of vessel D, and provided with a stopper for discharging the vessel and cleansing it. Directly over the center of vessel D is the hollow pipe H, having at the top a funnel. The central axis of this pipe must be coincident with that of vessel D and shaft $g$. The pipe H passes through cross-piece C and is fast to it. Upon the lower part of pipe H is fastened by a bush and key the stationary rake or scraper 5, the opposite end of which is curved to correspond with the interior surface of the rim $d'$, and it is provided with nibs or teeth, which scrape off and clear the interior surface of $d'$ from the amalgam or matter adhering as the vessel D rotates.

Having described the construction of my amalgamator, I now proceed to describe the manner of operating and using it.

A sufficient quantity of mercury being placed in vessel D—say enough to film the whole interior surface—the vessel D is put in rotation, and at the same time the pulverized ores are introduced, together with a current of water, through the funnel and pipe H, which falling on the cone $d$ are thereby spread into the vessel D on all sides. The vessel D being rapidly rotated, the mercury is by the centrifugal force thrown up and around the interior surface on all sides of the vessel and of the rim $d'$ and coats the surface, and what does not adhere falls down after reaching the edge of $d$ back into the body of vessel D. The gold in the dust comes in contact with the mercury so spread out on all sides and forms with it an amalgam, which continually falls, as the operation proceeds, from the interior surface of $d'$ to the bottom of D in the form of globules or small rolls, while the other particles of dust, which are lighter, and the water, are thrown out over the edge of $d'$, and down its exterior surface, and over the apron $e$ into the surrounding trough or vessel F, from which the water and earthy particles are discharged by a spout, G. All metals that are contained in the dust which do not have an affinity for the mercury strong enough to become amalgamated will thus be thrown out and pass over into the exterior trough, F. When sufficient amount of gold has been taken up and amalgamated to absorb the mercury, the rotation is stopped, and the globules or small rolls of amalgam removed, and fresh mercury being placed in the vessel D the operation is continued.

Having thus described my amalgamator, and the manner of using and operating the same, what I claim as my invention, and for which I desire Letters Patent, is—

1. The peculiar shape and construction of the rim or cover of the vessel D, in combination with the basin or body of said vessel, whereby, in connection with the mercury and water, as described, the gold or other precious metal becomes amalgamated and falls to the bottom of the basin, while the other parts pass over the sides, the basin being arranged and operated in the manner and for the purposes described.

2. The combining and arranging the exterior circular trough or vesssel, F, with the interior vessel, D, and its arrangements, in the manner and for the purposes described.

3. The combining and arranging pipe H with the central conical portion of the vessel D, whereby the dust and water entering the vessel D are distributed equally over all parts, as described.

4. The form and arrangement of the scraper or rake 5 within the vessel D, operating in the manner and for the purpose described.

P. G. GARDINER.

Witnesses:
 JAS. W. HALE,
 GEORGE W. FOX.